(12) United States Patent
Isono et al.

(10) Patent No.: US 8,689,947 B2
(45) Date of Patent: Apr. 8, 2014

(54) DISC BRAKE DEVICE

(75) Inventors: Hiroshi Isono, Mishima (JP); Michio Suzuki, Mishima (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 391 days.

(21) Appl. No.: 13/063,485

(22) PCT Filed: Sep. 11, 2009

(86) PCT No.: PCT/JP2009/004541
§ 371 (c)(1),
(2), (4) Date: Mar. 11, 2011

(87) PCT Pub. No.: WO2010/029768
PCT Pub. Date: Mar. 18, 2010

(65) Prior Publication Data
US 2011/0162918 A1    Jul. 7, 2011

(30) Foreign Application Priority Data
Sep. 11, 2008    (JP) ................................. 2008-233935

(51) Int. Cl.
*F16D 55/18*    (2006.01)
(52) U.S. Cl.
USPC ............................ 188/72.4; 188/71.8; 92/168
(58) Field of Classification Search
USPC .............. 188/72.4, 71.8, 73.1, 196 P, 322.18; 277/357, 434, 436, 437; 92/128, 168, 92/169.1, 170.1, 171.1
See application file for complete search history.

(56) References Cited

U.S. PATENT DOCUMENTS

| | | | | |
|---|---|---|---|---|
| 5,031,511 A | * | 7/1991 | Villata | ............................ 92/128 |
| 5,172,793 A | * | 12/1992 | Temple et al. | ............... 188/72.4 |
| 5,826,681 A | * | 10/1998 | Kubo et al. | .................. 188/71.8 |
| 6,439,351 B1 | * | 8/2002 | Sanitate et al. | ............. 188/72.4 |
| 6,502,673 B1 | * | 1/2003 | Toriyama | .................. 188/218 A |
| 2002/0092712 A1 | * | 7/2002 | Ishikawa et al. | ............. 188/72.4 |

FOREIGN PATENT DOCUMENTS

| | | |
|---|---|---|
| JP | 59 27339 | 2/1984 |
| JP | 63 99039 | 6/1988 |
| JP | 63 184235 | 11/1988 |

(Continued)

OTHER PUBLICATIONS

International Search Report issued Oct. 20, 2009 in PCT/JP09/004541 filed Sep. 11, 2009.

(Continued)

*Primary Examiner* — Pamela Rodriguez
(74) *Attorney, Agent, or Firm* — Oblon, Spivak, McClelland, Maier & Neustadt, L.L.P.

(57) ABSTRACT

In a disc brake device, a piston is movably supported to a cylinder portion of a caliper, friction pads are operable to push a disc rotor as the piston moving frontward during pressurization, a seal mechanism arranged at the cylinder portion is operable to return the piston to an initial position during depressurization, and the seal mechanism is constituted with a movable element arranged between the cylinder portion and the piston (15) as being movable frontward in the same direction of the piston, a first seal member elastically arranged between the piston and the movable element to make the movable element accompany the piston, a low elasticity member being compressively deformable with initial pressurization of the piston via the movable element, and a high elasticity member being compressively deformable with pressurization of the piston via the movable element.

16 Claims, 4 Drawing Sheets

(56) References Cited

FOREIGN PATENT DOCUMENTS

| | | |
|---|---|---|
| JP | 1 124437 | 8/1989 |
| JP | 5 65929 | 3/1993 |
| JP | 7 253128 | 10/1995 |
| JP | 2000 88014 | 3/2000 |
| WO | WO 2007/057929 A1 | 5/2007 |

OTHER PUBLICATIONS

Extended European Search Report issued on Jan. 6, 2012 in the corresponding European Patent Application No. 09812917.4.

\* cited by examiner

DISC BRAKE DEVICE

FIELD OF THE INVENTION

The present invention relates to a disc brake device which exerts braking force on a wheel via a disc rotor with friction resistance while friction pads sandwich the disc rotor rotating integrally with the wheel.

BACKGROUND OF THE INVENTION

In a typical disc brake device of a caliper floating type, a caliper is supported to a mounting bracket movably in a rotation axis direction of a wheel. In this case, a pair of slide pins are arranged at the caliper and a pair of fit holes to be fitted with the pair of the slide pins are arranged at the mounting bracket. By fitting the slide pins respectively to the fit holes as being slidable, the caliper is allowed to move. The caliper is U-shaped as striding a disc rotor. An inner pad (i.e., a friction pad) is movably supported to one side of the caliper and an outer pad (i.e., a friction pad) is fixed to the other side thereof. Further, an actuator having a piston to push the inner pad to the disc rotor is provided at one side of the disc rotor.

Accordingly, when a driver depresses a brake pedal, the actuator is activated with the depression force, so that the piston moves frontward to push the inner pad to the disc rotor and the caliper moves by reactive force due to the frontward movement of the piston so as to push the outer pad to the disc rotor. In this manner, by sandwiching the disc rotor with the pair of pads, brake force can be exerted on the wheel via the disc rotor.

By the way, in the above disc brake device, the piston is movably supported to a cylinder hole of the caliper and is maintained as being liquid-tight with a piston seal. It is configured that the piston moves frontward while deforming the piston seal when operating fluid is supplied to a hydraulic pressure chamber of the cylinder hole during braking and that the piston moves rearward to the hydraulic pressure chamber side due to restoring force of the deformed piston seal when hydraulic pressure is released from the hydraulic pressure chamber. Here, when the brake pedal depressing force by a driver is excessively large, the piston is pushed into the disc rotor side more than necessary and relative movement occurs between the piston and the piston seal. Then, so-called dragging, that is, continued contacting of the pad with the disc rotor, occurs since the piston cannot sufficiently move rearward with the restoring force of the piston seal. Accordingly, there may be occurrence that the piston is pushed back as the pad being kicked by the rotating disc rotor, that is, so-called knock back.

For example, Patent Literatures 1, 2 disclose solutions for such problems.

In a disc brake device disclosed in Patent Literature 1, an annular ring attaching groove is formed at an inner hole of a cylinder and a chamfered portion is formed to a pad side at an opening edge of the pad side of the ring attaching groove. Further, a retraction ring which seals a section between the piston and the cylinder and returns the piston during depressurization after braking is assembled to the ring attaching groove. Further, a circular recession opened to a pad side end wall of the ring attaching groove is formed at the cylinder and a deformable ring made of compressive material is assembled in the circular recession to allow entering deformation of the retraction ring into the circular recession. Here, hydraulic pressure at which deformation amount of the pad and the cylinder increasing in accordance with hydraulic pressure increase becomes larger than retraction amount of the piston caused by the retraction ring can be set at a high value. Accordingly, dragging can be suppressed even in a usage range having higher hydraulic pressure compared to the related art.

Further, in a disc brake caliper disclosed in Patent Literature 2, a piston seal frictionally engaged with an outer circumferential face of a piston due to a retainer and a disc spring urging the retainer in the direction of rearward movement of the piston are arranged at a large diameter hole portion formed at a caliper main body. Here, in the case of low brake fluid pressure, frontward movement of the retainer is blocked due to preload of the disc spring and the piston seal is elastically deformed into a chamfered portion due to frontward movement of the piston, and then, the piston is retracted by restoring force of the seal when braking is released. When a brake pad is worn, frontward movement with sliding against the piston is allowed after the seal is elastically deformed to an allowable limit, so that clearance can be corrected. On the other hand, in a case of high brake fluid pressure, the retainer and the seal move frontward as overcoming the preload of the disc spring, so that the piston is reliably retracted without occurrence of sliding against the piston. Accordingly, occurrence of dragging phenomenon of a pad can be prevented.

CITATION LIST

Patent Literature

Patent Literature 1: Japanese Patent Application Laid-open No. 07-253128

Patent Literature 2: Japanese Patent Application Laid-open No. 05-065929

BRIEF SUMMARY OF THE INVENTION

In the above disc brake device of Patent Literature 1, dragging is to be suppressed by assembling the deformable ring which allows entering deformation of the retraction ring made of compressive material into the circular recession to the ring attaching groove. However, the clearance between the piston and the pad (i.e. a rotor) varies corresponding to pressure history, knock back, pad wear, and the like. Therefore, when braking is performed in this state, stable retraction cannot be obtained since the position of the retraction ring is unstable. Accordingly, occurring dragging cannot be released. Further, it is difficult to correct the clearance between the piston and the pad (i.e., the rotor) to a specified value in the case of having the clearance therebetween larger than the specified value.

Further, in the disc brake caliper of Patent Literature 2, the retainer and the seal move frontward as overcoming the preload of the disc spring in the case of high brake fluid pressure and the piston is reliably returned as preventing sliding against the piston. However, in the case that the brake pad is worn and the brake fluid pressure is high, there may be a case that the piston moves frontward more than compression amount of the disc spring to cause sliding between the piston and the retraction ring. Accordingly, there is a possibility that the piston cannot be appropriately retracted and pad dragging phenomenon occurs.

That is, in the above cited literatures, the piston is to be returned by the piston seal. However, since the piston cannot be sufficiently returned with restoring force of the piston seal only, the problem of occurrence of pad dragging phenomenon remains.

To address the above issues, the present invention provides a disc brake device capable of suppressing occurrence of pad dragging phenomenon by appropriately returning the piston.

In order to solve the above mentioned problem and achieve the object, a disc brake device according to the present invention includes a disc rotor that rotates around a rotation axis; a friction pad that opposes to a friction face of the disc rotor; a cylinder that supports the friction pad as being capable of closing to and departing from the friction face of the disc rotor; a piston supported by the cylinder and capable of pushing the friction pad to the disc rotor as moving frontward during pressurization; a movable element arranged between the cylinder and the piston and movable frontward in the same direction of the piston; a following means that is elastically arranged between the piston and the movable element and makes the movable element accompany the piston; and an elastic means compressively deformable with pressurization of the piston via the movable element, wherein the piston and the movable element are supported to be relatively movable when a predetermined load set in advance is exerted.

In the disc brake device according to the present invention, one of the piston and the movable element is relatively movable frontward as frontward movement of the other of the piston and the movable element is blocked, when the piston and the movable element integrally move frontward during pressurization, and the piston and the movable element are integrally movable rearward during depressurization.

In the disc brake device according to the present invention, a start load of the piston is set to be larger than a start load of the movable element.

In order to solve the above mentioned problem and achieve the object, a disc brake device according to the present invention includes a disc rotor that rotates around a rotation axis; a friction pad that opposes to a friction face of the disc rotor; a cylinder that supports the friction pad as being capable of closing to and departing from the friction face of the disc rotor; a piston supported by the cylinder and capable of pushing the friction pad to the disc rotor as moving frontward during pressurization; a movable element arranged between the cylinder and the piston and movable frontward in the same direction of the piston; a following means that is elastically arranged between the piston and the movable element and makes the movable element accompany the piston; and an elastic means compressively deformable with pressurization of the piston via the movable element, wherein the movable element is supported to be movable relatively to the piston after the friction pad contacts to the disc rotor as the piston moving frontward during pressurization.

In the disc brake device according to the present invention, the following means is an elastic member that is arranged at the movable element, to which a predetermined pressing force is set in advance against the piston, and is arranged not to have an escape in the direction of piston frontward movement so as to suppress restoring force caused by elastic deformation with relative movement between the piston and the movable element.

In the disc brake device according to the present invention, the elastic member includes a low elasticity means compressively deformable with initial pressurization of the piston via the movable element, and a high elasticity means compressively deformable with pressurization of the piston via the movable element and having elastic force higher than that of the low elasticity means.

In the disc brake device according to the present invention, the low elasticity means and the high elasticity means are serially arranged between the cylinder and the movable element.

In the disc brake device according to the present invention, the low elasticity means and the high elasticity means are constituted with an O-ring arranged at a space defined between the piston and the movable element.

The disc brake device according to the present invention, includes a hydraulic pressure chamber arranged between the cylinder and the piston to make the piston and the movable element move frontward; a first seal arranged between the movable element and the piston to seal the hydraulic pressure chamber; and a second seal arranged between the cylinder and the movable element to seal the hydraulic pressure chamber.

The disc brake device according to the present invention, includes an elastic support member that elastically supports the movable element as being movable in the frontward movement direction of the piston and the rearward movement direction of the piston during non-pressurization of the piston.

In the disc brake device according to the present invention, the following means is an elastic member that is arranged at an outer circumferential face of the piston, to which a predetermined pressing force is set in advance against an inner circumferential face of the movable element, and is arranged not to have an escape in the direction of piston frontward movement so as to suppress restoring force caused by elastic deformation with relative movement between the piston and the movable element.

A disc brake device of the present invention includes a cylinder to support a friction pad as being capable of closing to and departing from a friction face of a disc rotor, a piston capable of pushing the friction pad to the disc rotor as moving frontward during pressurization, a movable element arranged between the cylinder and the piston as being movable frontward in the same direction as the piston, following means elastically arranged between the piston and the movable element to make the movable element accompany the piston, and an elastic means compressively deformable with pressurization of the piston via the movable element. Here, the piston and the movable element are supported to be relatively movable when a predetermined load which is previously set is exerted. Further, the movable element is relatively movable against the piston when the friction pad contacts to the disc rotor during pressurization.

Hence, when the piston is moved frontward, the movable element moves frontward via the following means as compressively deforming the elastic means, so that the piston is accompanied with the movable element almost in the entire range. Accordingly, it becomes possible to ensure specified pressure-dependent return amount across the entire hydraulic pressure range. Further, since the piston and the movable element are supported to be relatively movable with a predetermined load, the both are to be relatively movable when moving frontward. Therefore, the distance between the friction pad and the disc rotor can be appropriate as returning the piston by appropriate amount. As a result, occurrence of dragging phenomenon of the pad can be suppressed and stable braking feeling can be obtained.

DETAILED DESCRIPTION OF THE INVENTION

In the following, a disc brake device according to the present invention will be described in detail with reference to the drawings. Here, the present invention will not be limited to the embodiments. Further, structural elements of the following embodiments include elements being easily replaceable for a person skilled in the art or elements being substantially the same.

First Embodiment

Figure 1:
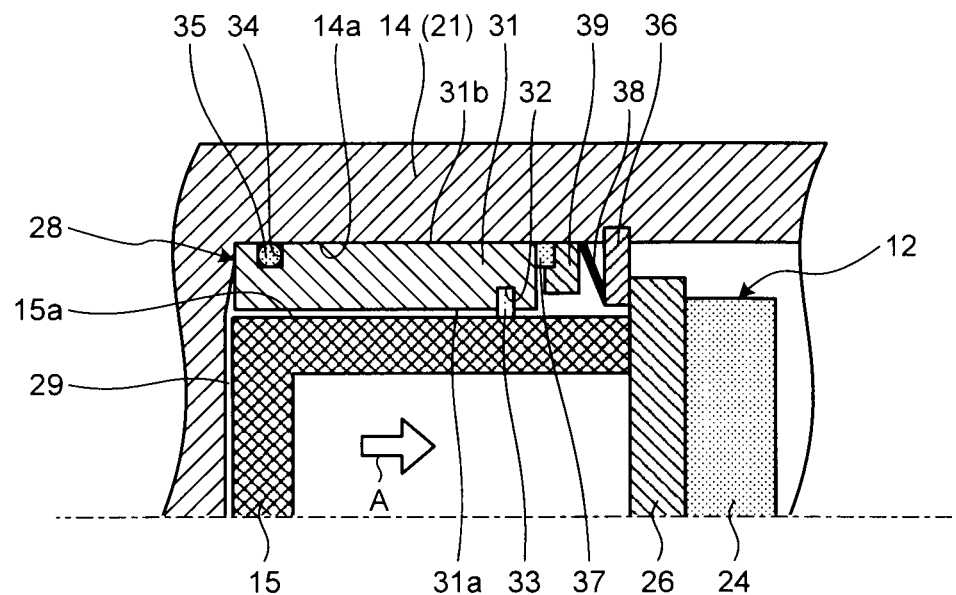
FIG. 1 is a sectional view illustrating a piston returning mechanism of a disc brake device according to a first embodiment of the present invention.
Figure 2:
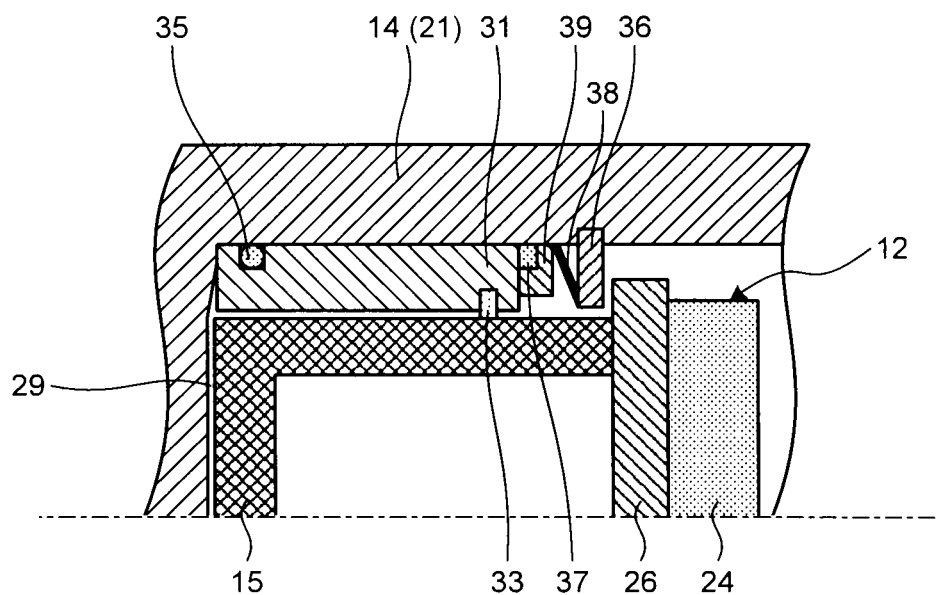
FIG. 2 is a sectional view illustrating operation of the piston returning mechanism of the first embodiment.
Figure 3:
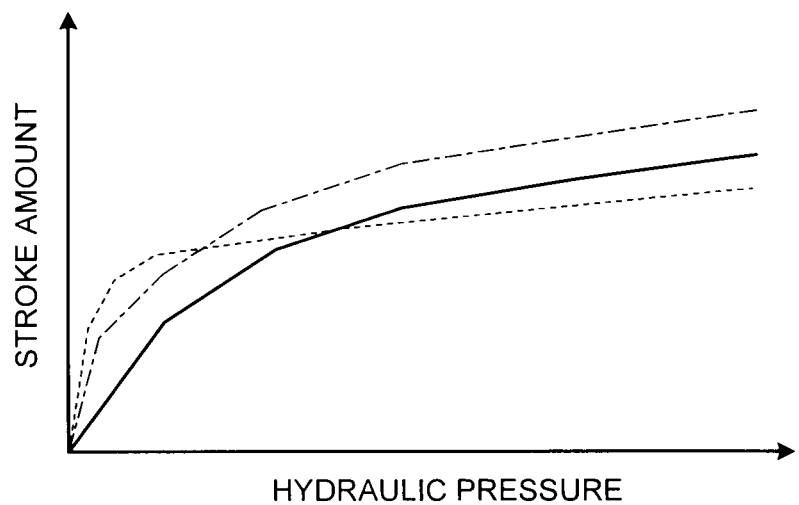
FIG. 3 is a graph indicating stroke amount against piston hydraulic pressure.
Figure 4:
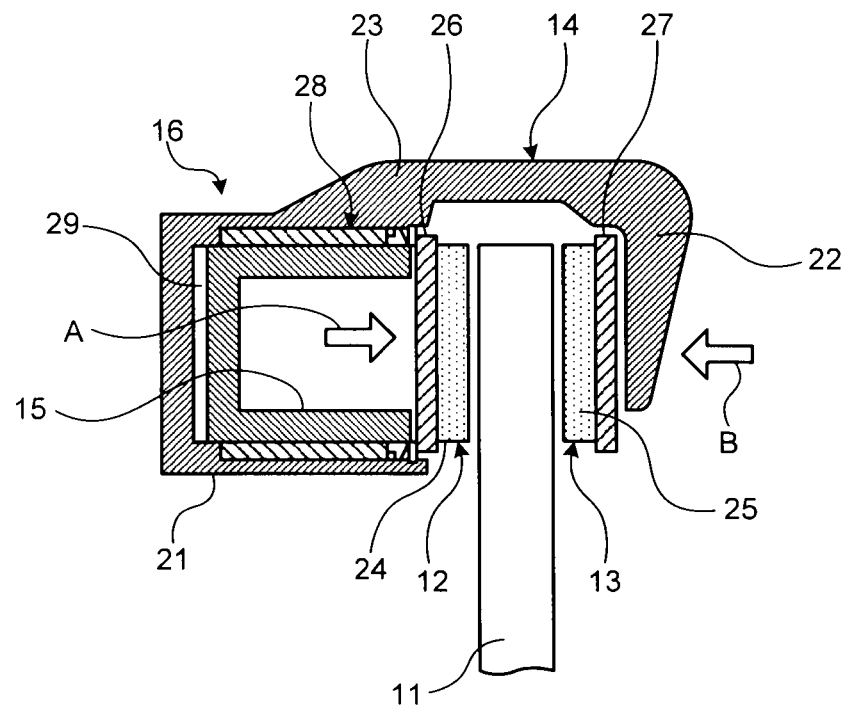
FIG. 4 is a sectional view illustrating the disc brake device of the first embodiment.

FIG. 1 is a sectional view illustrating a piston returning mechanism of a disc brake device according to the first embodiment of the present invention. FIG. 2 is a sectional view illustrating operation of the piston returning mechanism of the first embodiment. FIG. 3 is a graph indicating stroke amount against piston hydraulic pressure. FIG. 4 is a sectional view illustrating the disc brake device of the first embodiment.

The disc brake device of the first embodiment is a device to exert braking force on a wheel rotatably supported to a vehicle (not illustrated), which includes a disc rotor rotatably arranged as being integral with the wheel, a pair of friction pads to exert friction resistance force by sandwiching the disc rotor arranged to the vehicle side as being relatively non-rotatable to the wheel, and an actuator having a piston to push the friction pads to the disc rotor.

That is, as illustrated in FIG. 4, the disc brake device includes a disc rotor 11 to rotate around a rotation axis of an axle shaft as being integral with a wheel (not illustrated), a pair of friction pads 12, 13 respectively to oppose to friction faces at both sides of the disc rotor 11, a caliper 14 to support the pair of friction pads 12, 13 as being capable of closing to and departing from the friction faces of the disc rotor 11, and a cylinder mechanism (an actuator) 16 capable of pushing the friction pads 12, 13 to the disc rotor 11 with a piston 15.

Specifically, the caliper 14 is U-shaped as striding the disc rotor 11 and is provided with the cylinder mechanism 16 capable of making the piston 15 movable back and forth. The caliper 14 is constituted with a cylinder portion 21 having the cylinder mechanism 16 arranged, a claw portion 22 arranged at a position opposed to the cylinder portion 21 as sandwiching the disc rotor 11, and a connection portion 23 to connect the cylinder portion 21 and the claw portion 22.

The caliper 14 is supported movably along the direction of the rotation axis of the disc rotor 11, that is, the direction perpendicular to the rotation direction, with a mounting bracket (not illustrated).

The pair of friction pads 12, 13 arranged as respectively opposing to the friction faces at both sides of the disc rotor 11 are the inner pad 12 arranged at a side of the cylinder portion 21 of the caliper 14 and the outer pad 13 arranged at a side of the claw portion 22. The inner pad 12 and the outer pad 13 are configured that base end sections of friction materials 24, 25 are fixed respectively to back plates 26, 27. Further, the inner pad 12 and the outer pad 13 are movably supported along the direction of the rotation axis of the disc rotor 11 with the mounting bracket.

The cylinder mechanism 16 is configured that the piston 15 is movably supported to the cylinder portion 21 and that a seal mechanism 28 capable of sealing against an outer face of the piston 15 is attached to an inner face of the cylinder portion 21. Further, a hydraulic pressure chamber (i.e., a liquid pressure chamber) 29 is defined by the cylinder portion 21, the piston 15 and the seal mechanism 28 as top end section of the piston 15 being opposed to the back plate 26 of the inner pad 12.

Accordingly, when pressurizing is performed by supplying operating fluid to the hydraulic pressure chamber 29 of the cylinder mechanism 16, the piston 15 moves frontward in the direction of arrow A and a front face of the piston 15 pushes the back plate 26 of the inner pad 12, so that a front face of the inner pad 12 can be closed to a friction face of the disc rotor 11. At that time, the caliper 14 moves in the direction opposite to the piston 15 by reactive force due to the frontward movement of the piston 15, that is, the caliper 14 moves frontward in the direction of arrow B, so that a pressing face of the outer pad 13 can be closed to a friction face of the disc rotor 11.

Then, when the inner pad 12 and the outer pad 13 are pushed to the respective friction faces of the disc rotor 11, friction resistance force is generated between the rotating disc rotor 11 and the inner and outer pads 12, 13, so that braking force can be exerted to the disc rotor 11.

In this case, a later-mentioned seal member of the seal mechanism 28 attached to the cylinder portion 21 is intimately contacted to the piston 15. When the piston 15 is pressurized, the piston 15 moves frontward as accompanying the seal member. When the piston 15 is depressurized, the piston 15 is returned to a predetermined position. Due to the rearward movement of the piston 15, the inner pad 12 is to be apart from the disc rotor 11. The caliper 14 moves rearward by reaction force due to rearward movement of the piston 15, so that the outer pad 13 is to be apart from the disc rotor 11.

As described above, in the disc brake device of the first embodiment, the seal mechanism 28 functions as a piston returning mechanism to return the piston 15 during depressurization. As described later, the seal mechanism 28 includes a movable element arranged between the cylinder portion 21 and the piston 15 as being movable frontward in the same direction of the piston 15, following means elastically arranged between the piston 15 and the movable element to make the movable element accompany the piston 15, and a low elasticity means compressively deformable with initial pressurization to the piston 15 via the movable element, and a high elasticity means having higher elastic force than the low elasticity means as being compressively deformable with pressurization of the piston 15 via the movable element. In this case, the following means functions as the seal member.

That is, as illustrated in FIGS. 1 and 4, a support hole 14a is formed at the cylinder portion (i.e., a cylinder) 21 of the caliper 14. The piston 15 is movably supported having predetermined space at an outer circumferential face 15a thereof to the support hole 14a. A movable element 31 is inserted between the support hole 14a of the cylinder portion 21 and the outer circumferential face 15a of the piston 15, that is, inserted to the predetermined space. The movable element 31 is shaped cylindrical, in which a predetermined gap is formed as an inner circumferential face 31a thereof is opposed to the outer circumferential face 15a of the circumferential piston 15, while a predetermined gap is formed as an outer circumferential face 31b thereof is opposed to an inner circumferential face of the support hole 14a of the cylinder portion 21.

The movable element 31 has a ring-shaped hold groove 32 formed at the inner circumferential face 31a and a first seal member 33 functioning as the following means is held at the hold groove 32. Further, the movable element 31 has a ring-shaped hold groove 34 at the outer circumferential face 31b and a second seal member 35 is held at the hold groove 34. In this case, the ring-shaped first seal member 33 has a rectangular sectional shape while the ring-shaped second seal member 35 has a circular sectional shape (i.e., so-called an O-ring). Then, the first seal member 33 has higher elastic force than that of the second seal member 35 and is arranged not to have an escape in the direction of piston frontward movement so as to suppress restoring force caused by elastic deformation with relative movement between the piston 15 and the movable element 31. That is, the first seal member 33 is attached as the outer circumferential face thereof being fitted to the hold groove 32, while the inner circumferential face thereof is press-supported to the piston 15. In this case, the first seal member 33 is provided with predetermined pressing force which is previously set against the piston 15 in a state of being sandwiched between the movable element 31 and the piston 15, that is, straining force being larger than straining force of the second seal member 35 sandwiched between the movable element 31 and the cylinder portion 21. Further, when relative movement between the piston 15 and the movable element 31 occurs, the first seal member 33 is set to move integrally with the movable element 31 so as not to exert the restoring force caused by the elastic deformation.

Further, the hydraulic pressure chamber 29 is defined against the cylinder portion 21 and the piston 15. Then, the first seal member 33 pushes the outer circumferential face 15a of the piston 15 in a state of being held in the hold groove 32 of the movable element 31, so that predetermined straining force is set between the movable element 31 and the piston 15. Meanwhile, the second seal member 35 pushes the inner circumferential face of the support hole 14a of the cylinder portion 21 in a state of being held in the hold groove 34 of the movable element 31, so that predetermined straining force is set between the movable element 31 and the cylinder portion 21. Thus, since the first seal member 33 is arranged at the space between the movable element 31 and the piston 15 and the second seal member 35 is arranged at the space between the movable element 31 and the cylinder portion 21, leakage of operating fluid from the hydraulic pressure chamber 29 is prevented.

A ring-shaped stopper 36 located between the movable element 31 and the friction pad 12 (i.e., the back plate 26) is fixed to the support hole 14a of the cylinder portion 21. Further, a low elasticity member 37 and a high elasticity member 38 constituting the elastic member are serially arranged between the movable element 31 and the stopper 36 (i.e., the cylinder portion 21). The low elasticity member 37 being a ring-shaped rubber member is supported by a support member 39 being similarly ring-shaped and is intimately contacted to a face (i.e., a front face) of the movable element 31 in the frontward movement direction. The high elasticity member 38 being a ring-shaped disc spring with higher elastic force than that of the low elasticity member 37 is sandwiched between the support member 39 and the stopper 36 and is intimately contacted to the both.

The movable element 31 is urged in the rearward movement direction of the piston 15 with the elastic force of the low elasticity member 37 and the high elasticity member 38. When the hydraulic pressure chamber 29 is not pressurized, a rear face of the movable element 31 is set out at a position being contacted to a bottom face of the support hole 14a of the cylinder portion 21. During initial pressurization to the hydraulic pressure chamber 29, the movable element 31 moves frontward along with the piston 15 and the low elasticity member 37 is compressed thereby. Subsequently, when the pressurizing to the hydraulic pressure chamber 29 is continued, the movable element 31 further moves frontward along with the piston 15 and compresses the high elasticity member 38 after the low elasticity member 37 is compressed as being fully deformed.

As described above, in the present embodiment, the seal mechanism 28 constituted with the movable element 31, the seal members 33, 35, the stopper 36, the low elasticity member 37, the high elasticity member 38, and the like has a retraction function (i.e., a stroke absorption function) in addition to the seal function being respectively performed separately. That is, the seal function is performed by the first and second seal members 33, 35 and the retraction function (i.e., the stroke absorption function) is performed by the low elasticity member 37 and the high elasticity member 38.

Further, in the present embodiment, when pressurizing is performed by supplying operating fluid to the hydraulic pressure chamber 29, the hydraulic pressure is exerted to the movable element 31 and the piston 15. Here, a start load of the piston 15 is set to be larger than a start load of the movable element 31. In this case, the start load of the piston 15 denotes the load with which the piston 15 is to move relatively against the cylinder 21 and the start load of the movable element 31 is the load with which the movable element 31 is to move relatively against the piston 15. Specifically, the start load of the piston 15 is a friction load of the first seal member 33 and the start load of the movable element 31 is an addition of an initial compression load of the low elasticity member 37 to a friction load of the second seal member 35. That is, the seal mechanism 28 is set so as to satisfy the following expression.

(movable element load−difference between start loads)/stroke<retraction mechanism stiffness<
(movable element load+difference between start loads)/stroke In general, it is difficult to obtain perfect coincident of stiffness of the cylinder portion 21 and the piston 15 with stiffness of the retraction mechanism. Here, retraction amount (i.e., stroke absorption amount, return amount of the piston 15) varies by the amount of the stiffness difference. Accordingly, the stiffness variation is absorbed by the start load difference of the piston 15 and the movable element 31 by setting the seal mechanism 28 as described above, so that the stroke and the retraction of the piston 15 can be synchronized.

Here, when pressurizing is performed by supplying operating fluid to the hydraulic pressure chamber 29 in a state of FIG. 1, the piston 15 and the movable element 31 are pressurized. In this case, the start load of the piston 15 is set to be larger than the start load of the movable element 31 and the low elasticity member 37 is elastically deformed as accompanying the piston 15. Accordingly, when the piston 15 moves frontward in the direction of arrow A, the movable element 31 integrally moves frontward via the first seal member 33 and the top end section of the piston 15 contacts to the friction pad 12.

With such pressurization of ultralow pressure, the straining force between the piston 15 and the first seal member 33 and a spring constant of the low elasticity member 37 are set so as not to cause relative movement of the piston 15 and the first seal member 33 at the contact section (i.e., the seal portion) therebetween in a normal state. Accordingly, as illustrated in FIG. 2, the movable element 31 integrally moves frontward as accompanying the piston 15. Then, the low elasticity member 37 is compressively deformed due to the frontward movement of the movable element 31 along with the piston 15. The deformed amount of the low elasticity member 37 is to be the return amount of the piston 15.

Then, when depressurizing is performed by discharging operating fluid from the hydraulic pressure chamber 29, the movable element 31 moves rearward due to the restoring force of the compressively deformed low elasticity member 37 and the piston 15 moves rearward integrally therewith via the first seal member 33. In this case, since the movable element 31 moves integrally with the piston 15, the piston 15 is appropriately returned to a predetermined position (i.e., the position illustrated in FIG. 1).

On the other hand, when hydraulic pressure input is high pressure, the piston 15 further move frontward from a state illustrated in FIG. 2. Then, the first seal member 33 is intimately contacted to the piston 15 with predetermined straining force and the high elasticity member 38 is deformed accompanying the frontward movement of the piston 15. Accordingly, the movable element 31 moves frontward integrally with the piston 15. Then, the high elasticity member 38 is compressively deformed as maintaining the low elasticity member 37 in the compressively deformed state due to the frontward movement of the movable element 31 along with the piston 15. The deformed amount of the low elasticity member 37 and the high elasticity member 38 is to be the return amount of the piston 15.

When depressurizing is performed by discharging operating fluid from the hydraulic pressure chamber 29, the movable element 31 moves rearward firstly due to the restoring force of the compressively deformed high elasticity member 38, and then, the movable element 31 moves rearward consequently due to the restoring force of the compressively deformed low elasticity member 37. That is, due to the restoring force of the low elasticity member 37 and the high elasticity member 38 which are compressively deformed, the movable element 31 moves rearward and the piston 15 moves rearward integrally therewith via the first seal member 33. Then, the piston 15 is appropriately returned to the predetermined position (i.e., the position illustrated in FIG. 1).

Here, when the pressurizing force is excessively large or wear loss of the friction pad 12 is large, the piston 15 moves frontward more than necessary. Then, relative movement occurs between the piston 15 and the first seal member 33 as being sheared. However, in the present embodiment, the operation of only predetermined amount occurs at the time of contacting of the piston 15 and the operation to accompany the piston 15 occurs at the time of pressure generation. Accordingly, when depressurizing is performed by discharging operating fluid from the hydraulic pressure chamber 29, the movable element 31 and the piston 15 via the first seal member 33 are returned firstly due to the restoring force of the compressively deformed high elasticity member 38, and then, the movable element 31 and the piston 15 via the first seal member 33 move rearward consequently due to the restoring force of the compressively deformed low elasticity member 37. Accordingly, it becomes possible to ensure specified pressure-dependent return amount for the piston 15 across the entire hydraulic pressure range. Therefore, occurrence of dragging phenomenon of the friction pad 12 can be suppressed and stable braking feeling can be obtained.

In this case, according to the present embodiment, the piston 15 and the movable element 31 are supported to be relatively movable when a predetermined load which is previously set is exerted. That is, the start load of the piston 15 is set to be larger than the start load of the movable element 31. Accordingly, when distance between the friction pad 12 and the disc rotor 11 is shorter than a predetermined value, the piston 15 and the movable element 31 integrally move frontward and the friction pad 12 contacts to the disc rotor 11, and then, only the movable element 31 moves frontward to generate relative movement against the piston 15. In this case, by setting the difference between the start load of the piston 15 and the start load of the movable element 31, that is, a relative displacement load to generate relative displacement therebetween, to a load acting after the friction pad 12 contacts to the disc rotor 11, the movable element 31 moves frontward (i.e., moves relatively) against the piston 15 by predetermined amount. Subsequently, when depressurizing is performed by discharging operating fluid from the hydraulic pressure chamber 29, the piston 15 and the movable element 31 integrally move rearward by the same amount due to the restoring force of the elastically deformed elastic members 33, 38. Since the rearward movement amount is the same as the frontward movement amount of the movable element 31, the piston 15 (i.e., the friction pad 12) is to be returned more than the frontward movement amount. Accordingly, the distance between the friction pad 12 and the disc rotor 11 is to be the predetermined value and occurrence of dragging phenomenon of the friction pad 12 can be suppressed.

On the other hand, when the distance between the friction pad 12 and the disc rotor 11 is longer than the predetermined value, since the piston 15 and the movable element 31 integrally move frontward and the elastic members 33, 38 are compressed by predetermined amount, the piston 15 moves frontward causing relative movement against the movable element 31 before the friction pad 12 contacts to the disc rotor 11. Subsequently, when depressurizing is performed by discharging operating fluid from the hydraulic pressure chamber 29, the piston 15 and the movable element 31 integrally move rearward by the same amount due to the restoring force of the elastically deformed elastic members 33, 38. Since the rearward movement amount is the same as the frontward movement amount of the movable element 31, the piston 15 (i.e., the friction pad 12) is to be returned less than the frontward movement amount. Accordingly, the distance between the friction pad 12 and the disc rotor 11 is to be the predetermined value.

In the following, stroke amount against brake fluid pressure will be described. As indicated in FIG. 3, in a disc brake device of the related art, when frontward movement amount (indicated by the solid line in FIG. 3) of the piston 15 increases in accordance with increase of the brake fluid pressure, the return amount (indicated by the dotted line in FIG. 3) of the piston 15 caused by seal retraction exceeds the frontward movement amount (indicated by the solid line in FIG. 3) as increasing at an initial stage. However, since relative movement occurs between a piston seal and the piston 15, the seal retraction does not increase thereafter to fall below the frontward movement amount (indicated by the solid line in FIG. 3) of the piston 15. Meanwhile, in the disc brake device according to the present embodiment, the return amount (indicated by the dashed-dotted line) of the piston 15 due to the seal mechanism 28 increases continuously from the initial stage resulting in exceeding the frontward movement amount (indicated by the solid line in FIG. 3) across the entire range.

As describe above, in the disc brake device of the first embodiment, the piston 15 is movably supported to the cylinder portion 21 of the caliper 14. The piston 15 moves frontward during pressurization enabling the friction pads 12, 13 to push the disc rotor 11, while the piston 15 is to be capable of being returned to an initial position during depressurization due to the seal mechanism (i.e., the piston returning mechanism) 28 arranged at the cylinder portion 21. The seal mechanism 28 includes the movable element 31 arranged between the cylinder portion 21 and the piston 15 as being movable frontward in the same direction of the piston 15, the first seal member (following means) 33 elastically arranged between the piston 15 and the movable element 31 to make the movable element 31 accompany the piston 15, and low elasticity member 37 compressively deformable with initial pressurization of the piston 15 via the movable element 31, and high elasticity member 38 compressively deformable with pressurization of the piston 15 via the movable element 31.

Hence, when the piston 15 moves frontward, the movable element 31 moves frontward via the first seal member 33 as compressively deforming the low elasticity member 37, so that the piston 15 is accompanied with the movable element 31 almost in the entire range. Accordingly, it becomes possible to ensure specified pressure-dependent return amount across the entire hydraulic pressure range. Therefore, occurrence of dragging phenomenon of the friction pad 12 can be suppressed and stable braking feeling can be obtained.

Further, in the disc brake device according to the first embodiment, the movable element 31 is provided with the first seal member 33 and the first seal member 33 is provided with the predetermined pressing force which is previously set against the piston 15. Accordingly, the movable element 31 can appropriately move frontward to accompany the front movement of the piston 15 due to the first seal member 33 and the return amount of the piston 15 can be appropriately ensured by suppressing the relative movement between the piston 15 and the movable element 31.

Further, in the disc brake device of the first embodiment, the start load of the piston 15 is set to be larger than the start load of the movable element 31. Accordingly, relative displacement between the piston 15 and the movable element 31 can be generated during braking, so that the distance between the friction pad 12 and the disc rotor 11 can be adjusted to an appropriate value due to the relative displacement amount between the piston 15 and the movable element 31 even in the case that the distance between the friction pad 12 and the disc rotor 11 is shorter or longer than the appropriate value. Further, stiffness variation of the seal mechanism 28 is absorbed by the difference of the start loads of the piston 15 and the movable element 31, so that the stroke and the retraction of the piston 15 can be synchronized.

Further, in the disc brake device of the first embodiment, the low elasticity member 37 and the high elasticity member 38 are serially arranged between the stopper 36 fixed to the cylinder portion 21 and the movable element 31. Accordingly, the low elasticity member 37 and the high elasticity member 38 can be elastically deformed reliably by the movable element 31 and the return amount of the piston 15 in an initial stage can be reliably ensured due to deformation of the low elasticity member 37.

Further, in the disc brake device of the first embodiment, the seal function of the hydraulic pressure chamber 29 and the retraction function of the piston 15 are independently provided to the seal mechanism 28. That is, the hydraulic pressure chamber 29 to make the piston 15 and the movable element 31 move frontward is arranged between the cylinder portion 21 and the piston 15, and then, the first seal member 33 is arranged between the movable element 31 and the piston 15 and the second seal member 35 is arranged between the cylinder portion 21 and the movable element 31. In addition, the low elasticity member 37 and the high elasticity member 38 are serially arranged between the cylinder portion 21 and the movable element 31. Accordingly, the return amount of the piston 15 can be stably ensured due to the low elasticity member 37 and the high elasticity member 38, while leakage of operating fluid can be reliably prevented as the hydraulic pressure chamber 29 being liquid-tight with the dedicated seal members 33, 35.

Second Embodiment

Figure 5:
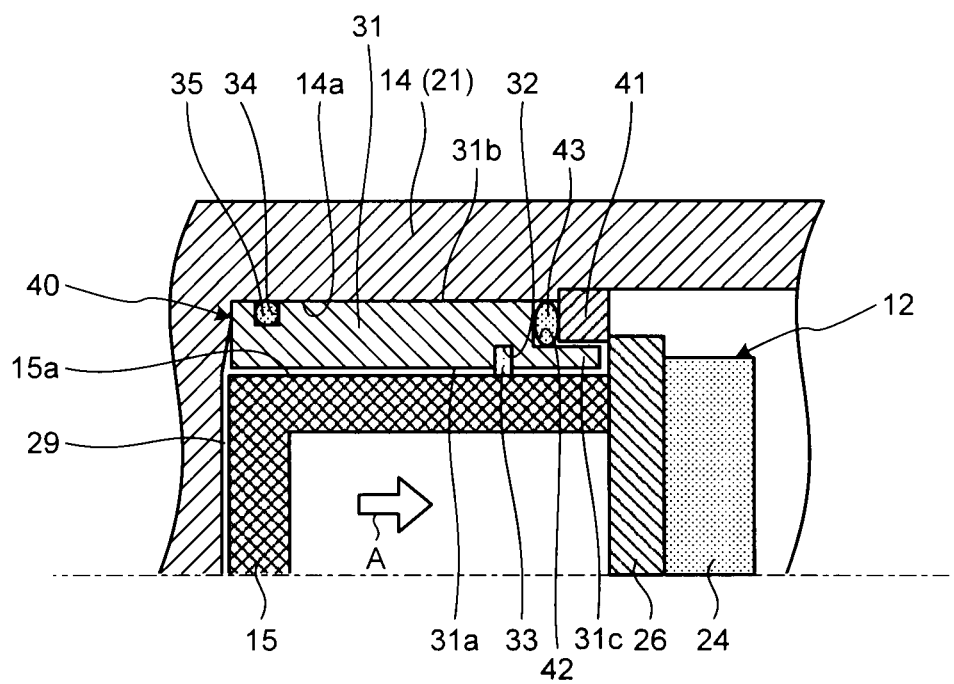
FIG. 5 is a sectional view illustrating a piston returning mechanism of a disc brake device according to a second embodiment of the present invention.

FIG. 5 is a sectional view illustrating a piston returning mechanism of a disc brake device according to the second embodiment of the present invention. Here, the same numeral is given to a component having the same function as described in the above embodiment and the description thereof will not be repeated.

In the disc brake device of the second embodiment, a seal mechanism 40 functions as the piston returning mechanism to return the piston 15 during depressurization, as illustrated in FIG. 5. That is, the piston 15 is movably supported having predetermined space at the outer circumferential face 15*a* thereof to the support hole 14*a* which is formed at the cylinder portion 21 of the caliper 14. The movable element 31 is arranged between the support hole 14*a* of the cylinder portion 21 and the outer circumferential face 15*a* of the piston 15.

The movable element 31 has the hold groove 32 formed at the inner circumferential face 31*a* and the first seal member 33 is held at the hold groove 32. Further, the movable element 31 has the hold groove 34 at the outer circumferential face 31*a* and the second seal member 35 is held at the hold groove 34. In this case, the first seal member 33 has higher elastic force than that of the second seal member 35 and the top end section being the inner circumferential side is press-supported to the piston 15. The first seal member 33 is provided with predetermined pressing force which is previously set against the piston 15 in a state of being sandwiched between the movable element 31 and the piston 15, that is, straining force being larger than straining force of the second seal member 35 sandwiched between the movable element 31 and the cylinder portion 21. Further, when relative movement between the piston 15 and the movable element 31 occurs, the first seal member 33 moves integrally with the movable element 31 as being set not to exert the restoring force caused by the elastic deformation.

A ring-shaped stopper 41 located between the movable element 31 and the friction pad 12 (i.e., the back plate 26) is fixed to the support hole 14*a* of the cylinder portion 21. Then, a space portion 42 is defined between the movable element 31 and the stopper 41 (i.e., the cylinder portion 21) and an elastic member 43 is arranged at the space portion 42. That is, a stepped portion 31*c* is formed at the movable element 31 by forming a cutout at the outer circumferential side of the end section thereof at the frontward movement side of the piston 15 and an inner circumferential face of the stopper 41 is fitted to the outer circumferential face of the stepped portion 31*c*. In this manner, the space portion 42 is defined by the cylinder portion 21, the movable element 31 and the stopper 41. The elastic member 43 being a rubber-made O-ring hermetically seals the space portion 42 so as to have a function with elastic deformation characteristics combining a low elasticity member and a high elasticity member.

The movable element 31 is urged in the rearward direction of the piston 15 with the elastic force of the elastic member 43. When the hydraulic pressure chamber 29 is not pressurized, a rear face of the movable element 31 is set out at a position being contacted to a bottom face of the support hole 14*a* of the cylinder portion 21. During initial pressurization to the hydraulic pressure chamber 29, the movable element 31 moves frontward along with the piston 15 and the elastic member 43 is compressed thereby.

In the present embodiment being similar the abovementioned first embodiment, the seal mechanism 40 has a retraction function (i.e., a stroke absorption function) in addition to the seal function being respectively performed separately. That is, the seal function is performed by the first and second seal members 33, 35 and the retraction function (i.e., the stroke absorption function) is performed by the elastic member 43. Further, in the present embodiment, when pressurization is performed by supplying operating fluid to the hydraulic pressure chamber 29, the hydraulic pressure is exerted to the movable element 31 and the piston 15. Here, the start load of the piston 15 is set to be larger than the start load of the movable element 31.

Here, when pressurizing is performed by supplying operating fluid to the hydraulic pressure chamber 29, the piston 15 and the movable element 31 are pressurized. In this case, the start load of the piston 15 is set to be larger than the start load of the movable element 31 and the low elasticity member 37 is elastically deformed as accompanying the piston 15. Accordingly, when the piston 15 moves frontward in the direction of arrow A, the movable element 31 integrally moves frontward via the first seal member 33 and the top end section of the piston 15 contacts to the friction pad 12.

With such pressurization of ultralow pressure, the straining force between the piston 15 and the first seal member 33 and a spring constant of the low elasticity member 37 are set so as not to cause relative movement of the piston 15 and the first seal member 33 at the contact section (i.e., the seal portion) therebetween in a normal state. Accordingly, the movable element 31 integrally moves frontward as accompanying the piston 15. Then, the elastic member 43 is compressively deformed due to the frontward movement of the movable element 31 along with the piston 15. The deformed amount of the elastic member 43 is to be the return amount of the piston 15.

Then, when depressurizing is performed by discharging operating fluid from the hydraulic pressure chamber 29, the movable element 31 moves rearward due to the restoring force of the compressively deformed elastic member 43 and the piston 15 moves rearward integrally therewith via the first seal member 33. In this case, since the movable element 31 moves integrally with the piston 15, the piston 15 is appropriately returned to a predetermined position.

On the other hand, when hydraulic pressure input is high pressure, the piston 15 further moves frontward. Then, the first seal member 33 is intimately contacted to the piston 15 with predetermined straining force and the elastic member 43 is deformed accompanying the frontward movement of the piston 15. Accordingly, the movable element 31 moves frontward integrally with the piston 15. Then, the elastic member 43 is further compressively deformed due to the frontward movement of the movable element 31 along with the piston 15. The deformed amount of the elastic member 43 is to be the return amount of the piston 15.

Here, when the pressurizing force is excessively large or wear loss of the friction pad 12 is large, the piston 15 moves frontward more than necessary. Then, relative movement occurs between the piston 15 and the first seal member 33 as being sheared. However, in the present embodiment, the operation of only predetermined amount occurs at the time of contacting of the piston 15 and the operation to accompany the piston 15 occurs at the time of pressure generation. Accordingly, when depressurizing is performed by discharging operating fluid from the hydraulic pressure chamber 29, the movable element 31 and the piston 15 via the first seal member 33 move rearward due to the restoring force of the compressively deformed elastic member 43. Therefore, occurrence of dragging phenomenon of the friction pad 12 can be suppressed and stable braking feeling can be obtained.

That is, the start load of the piston 15 is set to be larger than the start load of the movable element 31. Accordingly, when distance between the friction pad 12 and the disc rotor 11 is shorter than the predetermined value, the piston 15 and the movable element 31 integrally move frontward and the friction pad 12 contacts to the disc rotor 11, and then, only the movable element 31 moves frontward to generate relative movement against the piston 15. Subsequently, when depressurizing is performed by discharging operating fluid from the hydraulic pressure chamber 29, the piston 15 and the movable element 31 integrally move rearward by the same amount due to the restoring force of the elastically deformed elastic members 43. Since the rearward movement amount is the same as the frontward movement amount of the movable element 31, the piston 15 (i.e., the friction pad 12) is to be returned more than the frontward movement amount. Accordingly, the distance between the friction pad 12 and the disc rotor 11 is to be the predetermined value and occurrence of dragging phenomenon of the friction pad 12 can be suppressed. Here, when the distance between the friction pad 12 and the disc rotor 11 is longer than the predetermined value, the piston 15 moves frontward (i.e., moves relatively) against the movable element 31. Accordingly, the distance between the friction pad 12 and the disc rotor 11 is adjusted to the predetermined value when the piston 15 and the movable element 31 move rearward.

Hence, even with the elastic member 43 of the present embodiment, the return amount of the piston 15 due to the seal mechanism 40 increases continuously from the initial stage resulting in exceeding the frontward movement amount across the entire range in the same manner of elastic members 37, 38 of the first embodiment.

As described above, the disc brake device of the second embodiment includes, as the seal mechanism 40, the movable element 31 arranged between the cylinder portion 21 and the piston 15 as being movable frontward in the same direction of the piston 15, the first seal member (i.e., the following means) 33 elastically arranged between the piston 15 and the movable element 31 to make the movable element 31 accompany the piston 15, and the elastic member 43 compressively deformable with initial pressurization of the piston 15 via the movable element 31.

Hence, when the piston 15 moves frontward, the movable element 31 moves frontward via the first seal member 33 as compressively deforming the elastic member 43, so that the piston 15 is accompanied with the movable element 31 almost in the entire range. Accordingly, it becomes possible to ensure specified pressure-dependent return amount across the entire hydraulic pressure range. Therefore, occurrence of dragging phenomenon of the friction pad 12 can be suppressed and stable braking feeling can be obtained.

Further, in the disc brake device of the second embodiment, the space portion 42 is defined by the stepped portion 31c of the movable element 31 and the stopper 41 of the cylinder portion 21 and the elastic member 43 hermetically seals the space portion 42 so as to obtain a function with elastic deformation characteristics combining a low elasticity member and a high elasticity member. Accordingly, simplifying and downsizing of the device can be achieved.

Third Embodiment

Figure 6:
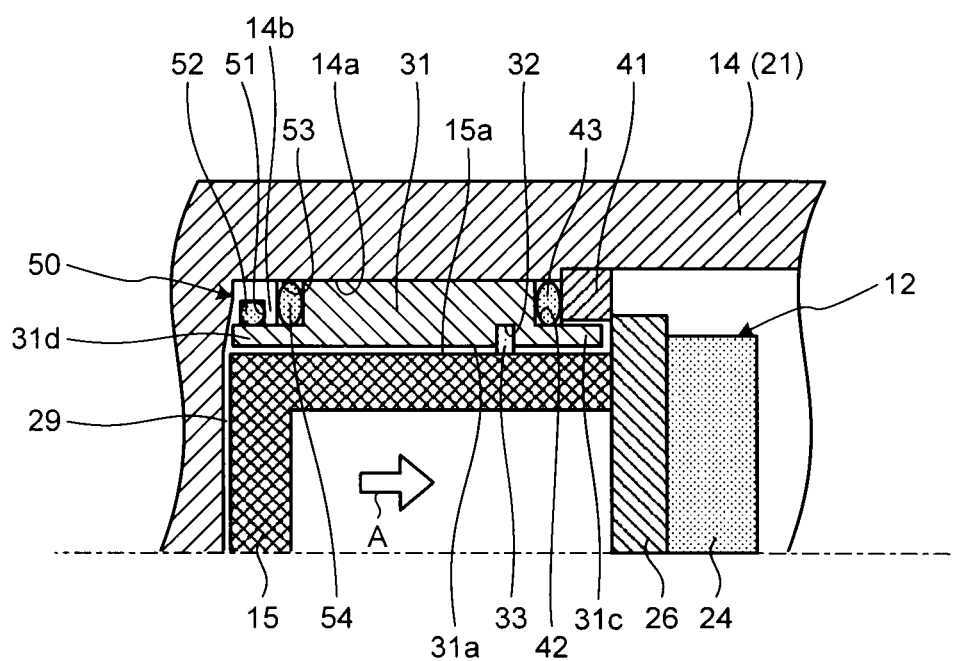
FIG. 6 is a sectional view illustrating a piston returning mechanism of a disc brake device according to a third embodiment of the present invention.

FIG. 6 is a sectional view illustrating a piston returning mechanism of a disc brake device according to the third embodiment of the present invention. Here, the same numeral is given to a component having the same function as described in the above embodiments and the description thereof will not be repeated.

In the disc brake device of the third embodiment, a seal mechanism 50 functions as the piston returning mechanism to return the piston 15 during depressurization, as illustrated in FIG. 6. The piston 15 is movably supported having predetermined space at the outer circumferential face 15a thereof to the support hole 14a which is formed at the cylinder portion 21 of the caliper 14. The movable element 31 is arranged between the support hole 14a of the cylinder portion 21 and the outer circumferential face 15a of the piston 15.

The movable element 31 has the hold groove 32 formed at the inner circumferential face 31a and the first seal member 33 is held at the hold groove 32. Further, a stepped portion 31d is formed at the movable element 31 by forming a cutout at the outer circumferential side of the end section thereof at the rearward movement side of the piston 15. Meanwhile, the support hole 14a of the cylinder portion 21 has a stepped portion 14b formed to have a small diameter at the end section of the rearward movement side of the piston 15. Then, the stepped portion 31d of the movable element 31 is fitted to the stepped portion 14b of the cylinder portion 21, while a hold groove 51 is formed at the inner circumferential face of a stepped portion 14b. A second seal member 52 is held at the hold groove 51. In this case, the first seal member 33 has higher elasticity than that of the second seal member 52 and the top end section being the inner circumferential side is press-supported to the piston 15. Here, the first seal member 33 is provided with predetermined pressing force which is previously set against the piston 15 in a state of being sandwiched between the movable element 31 and the piston 15, that is, straining force being larger than straining force of the second seal member 52 sandwiched between the movable element 31 and the cylinder portion 21. Further, when relative movement between the piston 15 and the movable element 31 occurs, the first seal member 33 is set to move integrally with the movable element 31 so as not to exert the restoring force caused by the elastic deformation.

The ring-shaped stopper 41 located between the movable element 31 and the friction pad 12 is fixed to the support hole 14a of the cylinder portion 21. Then, the space portion 42 is defined between the front end section of the movable element 31 and the stopper 41 and an elastic member 43 is arranged at the space portion 42. The elastic member 43 being a rubber-made O-ring hermetically seals the space portion 42 so as to have a function with elastic deformation characteristics combining a low elasticity member and a high elasticity member. Further, a space portion 53 is defined between the rear end section of the movable element 31 and the cylinder portion 21 and an elastic member 54 is arranged at the space portion 53. That is, an outer circumferential face of the stepped portion 31d of the movable element 31 is fitted to the inner circumferential face of the stepped portion 14b of the cylinder portion 21, so that the space portion 53 is defined by the cylinder portion 21 and the movable element 31. The elastic member 54 being a rubber-made O-ring hermetically seals the space portion 53 so as to have a function with elastic deformation characteristics combining a low elasticity member and a high elasticity member.

That is, the elastic members 43, 54 push the cylinder portion 21 in a state of being held respectively in the space portions 42, 53 of the movable element 31, so that predetermined straining force is set between the movable element 31 and the cylinder portion 21. In other words, the elastic members 43, 54 function as elastic support members to support floating of the movable element 31 within the cylinder portion 21 (i.e., the support hole 14a), that is, to urge and support the movable element 31 movably in the frontward movement direction and the rearward movement direction of the piston 15.

Accordingly, during initial pressurization to the hydraulic pressure chamber 29, the movable element 31 moves frontward along with the piston 15 to be capable of compressing the elastic member 43. Meanwhile, during depressurization, the movable element 31 moves rearward along with the piston 15 to be capable of compressing the elastic member 54.

Since other operations of the seal mechanism 50 are similar to the above embodiments, the description thereof will not be repeated.

As described above, the disc brake device of the third embodiment includes, as the seal mechanism 50, the movable element 31 arranged between the cylinder portion 21 and the piston 15 as being movable frontward in the same direction of the piston 15, the first seal member (i.e., the following means) 33 elastically arranged between the piston 15 and the movable element 31 to make the movable element 31 accompany the piston 15, and the elastic member 43 compressively deformable with initial pressurization of the piston 15 via the movable element 31.

Hence, when the piston 15 moves frontward, the movable element 31 moves frontward via the first seal member 33 as compressively deforming the elastic member 43, so that the piston 15 is accompanied with the movable element 31 almost in the entire range. Accordingly, it becomes possible to ensure specified pressure-dependent return amount across the entire hydraulic pressure range. Therefore, occurrence of dragging phenomenon of the friction pads 12, 13 can be suppressed and stable braking feeling can be obtained.

Further, in the disc brake device of the third embodiment, the elastic member 54 is held in the space portion 53 formed between the rear end section of the movable element 31 and the stepped portion 14b, while the elastic member 43 is held in the space portion 42 formed between the front end section of the movable element 31 and the stopper 41. Accordingly, since the movable element 31 is urged and supported movably in the frontward movement direction and the rearward movement direction in the support hole 14a by the respective elastic members 43, 54, the elastic member 43 is compressed when the movable element moves frontward and the elastic member 54 is compressed when the movable element 31 moves rearward. Therefore, even in the case that the disc rotor 11 moves as inclining to the axial direction during vehicle turning, absorption therefor can be performed by the movable element 31 and brake feeling can be improved as suppressing increase of operating fluid amount.

Further, since the movable element 31 is urged and supported movably in the frontward movement direction and the rearward movement direction by the respective elastic members 43, 54, the start load of the movable element 31 can be reduced and the stroke and the retraction of the piston 15 can be synchronized as absorbing the stiffness variation of the seal mechanism 50 by the start load difference of the piston 15 and the movable element 31.

Fourth Embodiment

Figure 7:
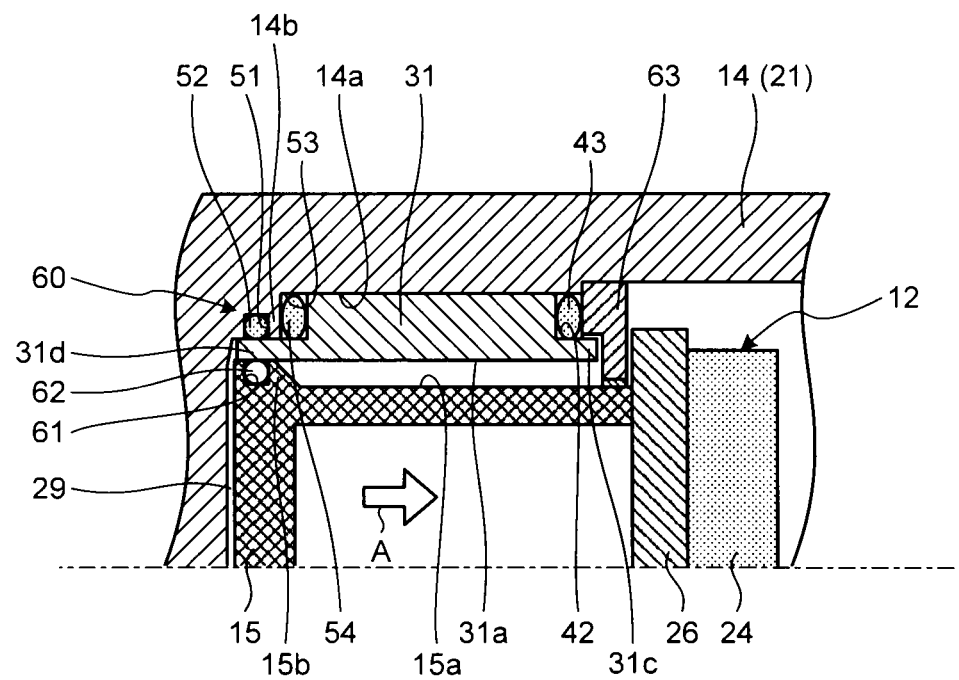
FIG. 7 is a sectional view illustrating a piston returning mechanism of a disc brake device according to a fourth embodiment of the present invention.

FIG. 7 is a sectional view illustrating a piston returning mechanism of a disc brake device according to the fourth embodiment of the present invention. Here, the same numeral is given to a component having the same function as described in the above embodiment and the description thereof will not be repeated.

In the disc brake device of the fourth embodiment, a seal mechanism 60 functions as the piston returning mechanism to return the piston 15 during depressurization, as illustrated in FIG. 7. The piston 15 is movably supported having predetermined space at the outer circumferential face 15a thereof to the support hole 14a which is formed at the cylinder portion 21 of the caliper 14. The movable element 31 is arranged between the support hole 14a of the cylinder portion 21 and the outer circumferential face 15a of the piston 15.

The piston 15 has a stepped portion 15b formed to have a larger diameter than the outer circumferential face 15a at the end section of the rearward movement side. A hold groove 61 is formed at the outer circumferential face of the stepped portion 15b and a first seal member (i.e., the following means) 62 is held at the hole groove 61. Further, the stepped portion 31d of the movable element 31 is fitted to the stepped portion 14b of the cylinder portion 21, so that the hold groove 51 is formed at the inner circumferential face of the stepped portion 14d. The second seal member 52 is held at the hold groove 51. In this case, the first seal member 62 has higher elasticity than that of the second seal member 52 and the outer circumferential section thereof is press-supported to the movable element 31. Here, the first seal member 62 is provided with predetermined pressing force which is previously set against the movable element 31 in a state of being sandwiched between the movable element 31 and the piston 15, that is, straining force being larger than straining force of the second seal member 52 sandwiched between the movable element 31 and the cylinder portion 21. Further, when relative movement between the piston 15 and the movable element 31 occurs, the first seal member 62 is set to move integrally with the movable element 31 so as not to exert the restoring force caused by the elastic deformation.

A ring-shaped stopper 63 located between the movable element 31 and the friction pad 12 is fixed to the support hole 14a of the cylinder portion 21. Then, the space portion 42 is defined between the front end section of the movable element 31 and the stopper 63 and an elastic member 43 is arranged at the space portion 42. Further, the space portion 53 is defined between the rear end section of the movable element 31 and the cylinder portion 21 and an elastic member 54 is arranged at the space portion 53. That is, the elastic members 43, 54 push the cylinder portion 21 in a state of being held respectively in the space portions 42, 53 of the movable element 31, so that predetermined straining force is set between the movable element 31 and the cylinder portion 21. In other words, the elastic members 43, 54 function as elastic support members to support floating of the movable element 31 within the cylinder portion 21 (i.e., the support hole 14a), that is, to urge and support the movable element 31 movably in the frontward movement direction and the rearward movement direction of the piston 15.

Accordingly, during initial pressurization to the hydraulic pressure chamber 29, the movable element 31 moves frontward along with the piston 15 to be capable of compressing the elastic member 43. Meanwhile, during depressurization, the movable element 31 moves rearward along with the piston 15 to be capable of compressing the elastic member 54.

Further, the stopper 63 is disc-shaped and the outer circumferential face 15a of the piston 15 is movably fitted to an inner circumferential face thereof. Accordingly, the stopper 63 functions as a guide for the piston 15.

Since other operations of the seal mechanism 60 are similar to the above embodiments, the description thereof will not be repeated.

As described above, the disc brake device of the fourth embodiment includes, as the seal mechanism 60, the movable element 31 arranged between the cylinder portion 21 and the piston 15 as being movable frontward in the same direction of the piston 15, the first seal member (i.e., the following means) 62 elastically arranged between the piston 15 and the movable element 31 to make the movable element 31 accompany the piston 15, and the elastic member 43 compressively deformable with initial pressurization of the piston 15 via the movable element 31.

Hence, when the piston 15 moves frontward, the movable element 31 moves frontward via the first seal member 62 as compressively deforming the elastic member 43, so that the piston 15 is accompanied with the movable element 31 almost in the entire range. Accordingly, it becomes possible to ensure specified pressure-dependent return amount across the entire hydraulic pressure range. Therefore, occurrence of dragging phenomenon of the friction pads 12, 13 can be suppressed and stable braking feeling can be obtained.

Further, in the disc brake device of the fourth embodiment, the hold groove 61 is formed at the outer circumferential face of the stepped portion 15b of the piston 15 and the first seal member 62 is held at the hold groove 61. Here, the first seal member 62 is pushed to the movable element 31 with higher elastic force than that of the second seal member 52. Accordingly, by arranging the first seal member 62 at the piston 15 side, the piston 15 and the movable element 31 can be downsized in the radial direction and the axial direction. In addition, since the stopper 63 functions as the guide for the piston 15, the piston 15 is supported by two positions of the front and rear. Accordingly, the piston 15 is movably supported in a stable manner and operational efficiency can be improved.

Here, in the above embodiments, the low elasticity means and the high elasticity means are configured with the low elasticity member 37 and the high elasticity member 38. However, not limited to the two elastic members, it may employ a mechanism which has the two functions.

Further, in the above embodiments, the start load of the piston 15 is set to be larger than the start load of the movable element 31. Accordingly, when distance between the friction pad 12 and the disc rotor 11 is shorter than the predetermined value, the piston 15 and the movable element 31 integrally move frontward and the friction pad 12 contacts to the disc rotor 11, and then, only the movable element 31 moves frontward causing relative movement against the piston 15. On the other hand, when the distance between the friction pad 12 and the disc rotor 11 is longer than the predetermined value, the piston 15 and the movable element 31 integrally move frontward and the elastic members 33, 38, 43, 54 are compressed thereby, and then, only the piston 15 moves frontward causing relative movement against the movable element 31. However, the disc brake device of the present invention is not limited to the above configuration.

That is, the movable element 31 may only be supported as being relatively movable against the piston 15 when a predetermined load which is previously set is exerted after the pads 12, 13 contact to the disc rotor 11 due to the frontward movement of the piston during pressurization. Accordingly, when the distance between the friction pad 12 and the disc rotor 11 is longer than the predetermined value, only the piston 15 firstly moves frontward causing relative movement against the movable element 31 during pressurization and the frontward movement is blocked by the pads 12, 13 contacting to the disc rotor 11, and then, the movable element 31 moves frontward relatively against the piston 15 when the hydraulic pressure increases. On the other hand, during depressurization, the piston 15 and the movable element 31 integrally move rearward. In this case, the start load of the piston 15 may only be set to be smaller than the start load of the movable element 31.

INDUSTRIAL APPLICABILITY

As described above, a disc brake device of the present invention enables to suppress occurrence of pad dragging phenomenon by appropriately returning a piston. Accordingly, the present invention is preferably applied to any disc brake device.

REFERENCE SIGNS LIST

11 DISC ROTOR
12 INNER PAD (FRICTION PAD)
13 OUTER PAD (FRICTION PAD)
14 CALIPER
15 PISTON
16 CYLINDER MECHANISM
21 CYLINDER PORTION
28, 40, 50, 60 SEAL MECHANISM (PISTON RETURNING MECHANISM)
29 HYDRAULIC PRESSURE CHAMBER
31 MOVABLE ELEMENT
33, 62 FIRST SEAL MEMBER (FOLLOWING MEANS)
35, 52 SECOND SEAL MEMBER
36 STOPPER
37 LOW ELASTICITY MEMBER (ELASTIC MEMBER)
38 HIGH ELASTICITY MEMBER (ELASTIC MEMBER)
39 SUPPORT MEMBER
41, 63 STOPPER
42, 53 SPACE PORTION
43, 54 ELASTIC MEMBER

The invention claimed is:

1. A disc brake device, comprising:
a disc rotor that rotates around a rotation axis;
a friction pad that opposes to a friction face of the disc rotor;
a cylinder that supports the friction pad as being capable of closing to and departing from the friction face of the disc rotor;
a piston supported by the cylinder and capable of pushing the friction pad to the disc rotor as moving frontward during pressurization;
a movable element arranged between the cylinder and the piston and movable frontward in the same direction of the piston;
a following unit that is elastically arranged between the piston and the movable element and makes the movable element accompany the piston; and
an elastic unit compressively deformable with pressurization of the piston via the movable element, wherein
a start load of the piston is set to be larger than a start load of the movable element,
the piston and the movable element are supported to be relatively movable when a predetermined load set in advance is exerted, and
the elastic unit includes a low elasticity unit compressively deformable with initial pressurization of the piston via the movable element, and a high elasticity unit compressively deformable with pressurization of the piston via the movable element and having elastic force higher than that of the low elasticity unit.

2. The disc brake device according to claim 1, wherein
one of the piston and the movable element is relatively movable frontward as frontward movement of the other of the piston and the movable element is blocked, when the piston and the movable element integrally move frontward during pressurization, and
the piston and the movable element are integrally movable rearward during depressurization.

3. The disc brake device according to claim 2, wherein the movable element is supported to be movable relatively to the piston after the friction pad contacts to the disc rotor as the piston moving frontward during pressurization.

4. The disc brake device according to claim 2, wherein the following unit is an elastic member that is arranged at the movable element, to which a predetermined pressing force is set in advance against the piston, and is arranged not to have an escape in the direction of piston frontward movement so as to suppress restoring force caused by elastic deformation with relative movement between the piston and the movable element.

5. The disc brake device according to claim 2, further comprising:
a hydraulic pressure chamber arranged between the cylinder and the piston to make the piston and the movable element move frontward;
a first seal arranged between the movable element and the piston to seal the hydraulic pressure chamber; and
a second seal arranged between the cylinder and the movable element to seal the hydraulic pressure chamber.

6. The disc brake device according to claim 1, wherein the movable element is supported to be movable relative to the piston after the friction pad contacts the disc rotor as the piston moves frontward during pressurization.

7. The disc brake device according to claim 6, wherein the following unit is an elastic member that is arranged at the movable element, to which a predetermined pressing force is set in advance against the piston, and is arranged not to have an escape in the direction of piston frontward movement so as to suppress restoring force caused by elastic deformation with relative movement between the piston and the movable element.

8. The disc brake device according to claim 6, further comprising:
a hydraulic pressure chamber arranged between the cylinder and the piston to make the piston and the movable element move frontward;
a first seal arranged between the movable element and the piston to seal the hydraulic pressure chamber; and
a second seal arranged between the cylinder and the movable element to seal the hydraulic pressure chamber.

9. The disc brake device according to claim 1, wherein the following unit is an elastic member that is arranged at the movable element, to which a predetermined pressing force is set in advance against the piston, and is arranged not to have an escape in the direction of piston frontward movement so as to suppress restoring force caused by elastic deformation with relative movement between the piston and the movable element.

10. The disc brake device according to claim 1, wherein the low elasticity unit and the high elasticity unit are serially arranged between the cylinder and the movable element.

11. The disc brake device according to claim 10, wherein the low elasticity unit and the high elasticity unit are constituted with an O-ring arranged at a space defined between the piston and the movable element.

12. The disc brake device according to claim 10, wherein the movable element compresses the high elasticity member after the low elasticity member is compressed as being fully deformed when the piston is pressurized.

13. The disc brake device according to claim 1, wherein the low elasticity unit and the high elasticity unit are constituted with an O-ring arranged at a space defined between the piston and the movable element.

14. The disc brake device according to claim 1, further comprising:
- a hydraulic pressure chamber arranged between the cylinder and the piston to make the piston and the movable element move frontward;
- a first seal arranged between the movable element and the piston to seal the hydraulic pressure chamber; and
- a second seal arranged between the cylinder and the movable element to seal the hydraulic pressure chamber.

15. The disc brake device according to claim 1, further comprising:
- an elastic support member that elastically supports the movable element as being movable in the frontward movement direction of the piston and the rearward movement direction of the piston during non-pressurization of the piston.

16. The disc brake device according to claim 1, wherein the following unit is an elastic member that is arranged at an outer circumferential face of the piston, to which a predetermined pressing force is set in advance against an inner circumferential face of the movable element, and is arranged not to have an escape in the direction of piston frontward movement so as to suppress restoring force caused by elastic deformation with relative movement between the piston and the movable element.

* * * * *